United States Patent [19]
Browning et al.

[11] Patent Number: 6,164,165
[45] Date of Patent: Dec. 26, 2000

[54] TUBE SPINNER

[75] Inventors: Burt O. Browning; Steven K. Bradford, both of Edmond, Okla.

[73] Assignee: Dana Corporation, Toledo, Ohio

[21] Appl. No.: 09/220,253

[22] Filed: Dec. 23, 1998

[51] Int. Cl.[7] .................................................. B25B 13/50
[52] U.S. Cl. .......................... 81/57.34; 81/57.35; 81/469; 81/57.16; 29/240; 29/428
[58] Field of Search ................. 81/57.34, 57.16, 81/57.19, 57.15, 57.2, 57.24, 57.33, 57.35, 57.36, 467, 469, 470; 29/240, 282, 428

[56] References Cited

U.S. PATENT DOCUMENTS 4,092,881  6/1978  Jurgens et al. .
4,674,366  6/1987  Lauer et al. .
5,740,702  4/1998  Smith .

*Primary Examiner*—D. S. Meislin
*Attorney, Agent, or Firm*—Rader, Fishman & Grauer PLLC

[57] ABSTRACT

A tube spinner for assembling vehicle tie rod assemblies is disclosed. The tube spinner includes a support structure for supporting a tapped tube, a rotating device for rotating the tube within the support structure into threaded engagement with one or more sockets simultaneously and a restraining structure for locking the sockets against rotation. In a preferred embodiment, a plurality of casters are provided for supporting a tube along a main axis of the tube. Generally U-shaped tracks are placed adjacent left and right ends of the tube to prevent rotation of sockets being attached to the left and right ends of the tube. A motor driven friction wheel is brought into engagement with an outer circumference of the tube for rotating the tube along its main axis and simultaneously threading the tube onto one or more sockets.

9 Claims, 1 Drawing Sheet

TUBE SPINNER

FIELD OF THE APPLICATION

The present invention relates to tie rods for a vehicle. More particularly, the invention relates to an apparatus for spinning a tapped tube into engagement simultaneously with one or more sockets of a tie rod assembly.

BACKGROUND OF THE INVENTION

Vehicle tie rod assemblies may consist of a tapped tube having left and right ends. A left hand socket is threaded upon the left end of the tapped tube while a right hand socket is threaded upon the right end of the tapped tube. Often the sockets are off-set from a main axis of the tapped tube, causing an out of balance condition.

Conventional methods of assembling a tie rod assembly result in many problems. For example, one method of assembly involves clamping the tube in a location and using impact guns mounted on guide rails to spin the sockets into threaded engagement with the tube. Because the sockets may be off-set and out-of-balance, and because the impact gun provides a sharp force, the sockets tend to bind within the tube, resulting in a rejected part since it exceeds the acceptable assembly tolerances. Another method of assembling right and left hand sockets to a tapped tube includes first threading one socket into one end of the tube and then threading a second socket into a second end of the tube. This latter method is both time consuming and labor intensive and may not result in equal torque being applied to each socket.

SUMMARY OF THE INVENTION

The present invention is directed to a tube spinner for a vehicle tie rod assembly. The tube spinner includes a support structure for supporting a tapped tube along a main axis of the tube, a rotating device for rotating the tapped tube within the support structure into threaded engagement with one or more sockets simultaneously, and a restraining structure for locking the sockets against rotation while the rotating device is rotating the tapped tube.

In a preferred embodiment, the support structure includes a plurality of casters. Generally U-shaped tracks are placed adjacent left and right ends of the tube to prevent rotation of sockets being attached to the left and right ends of the tube. At least one motor driven friction wheel is brought into engagement with an outer circumference of the tube for rotating the tube along its main axis while the sockets are locked against rotation within the generally U-shape tracks adjacent either end of the tube. The tube spinner of the present invention thus spins a tube, simultaneously threading the tube concentrically onto one or more sockets.

In a further embodiment, the tube spinner includes a set of limit switches that serve to stop the tube spinner if the threading torque provided by the motor driven friction wheel exceeds a predetermined value.

The tube spinner of the present invention thus provides a simple, quiet method for assembling vehicle tie rods with equally torqued sockets attached to a central tube. The U-shaped tracks allow self-centering of offset sockets, and limit switches engage to stop the tube spinner if predetermined torque tolerances are exceeded during assembly.

BRIEF DESCRIPTION OF THE DRAWINGS

The features and inventive aspects of the present invention will become more apparent upon reading the following Detailed Description, Claims, and Drawings, of which the following is a brief description:

DETAILED DESCRIPTION OF PREFERRED EMBODIMENTS

Figure 1:
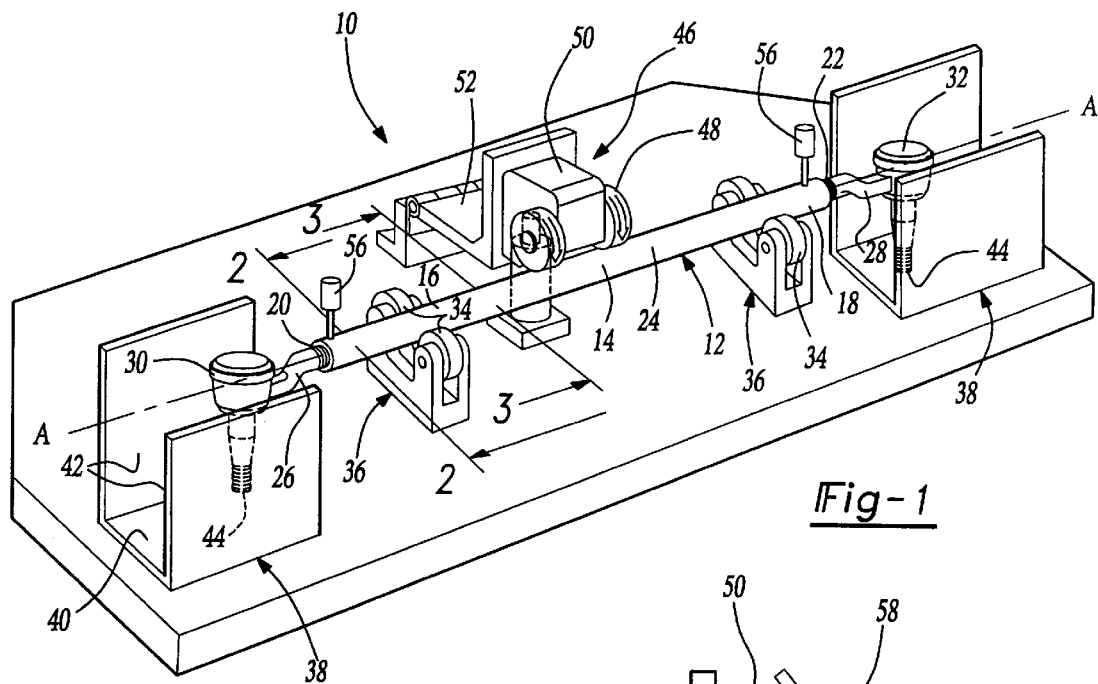
FIG. 1 is a perspective view of an apparatus embodying the invention.
Figures 2, 3:
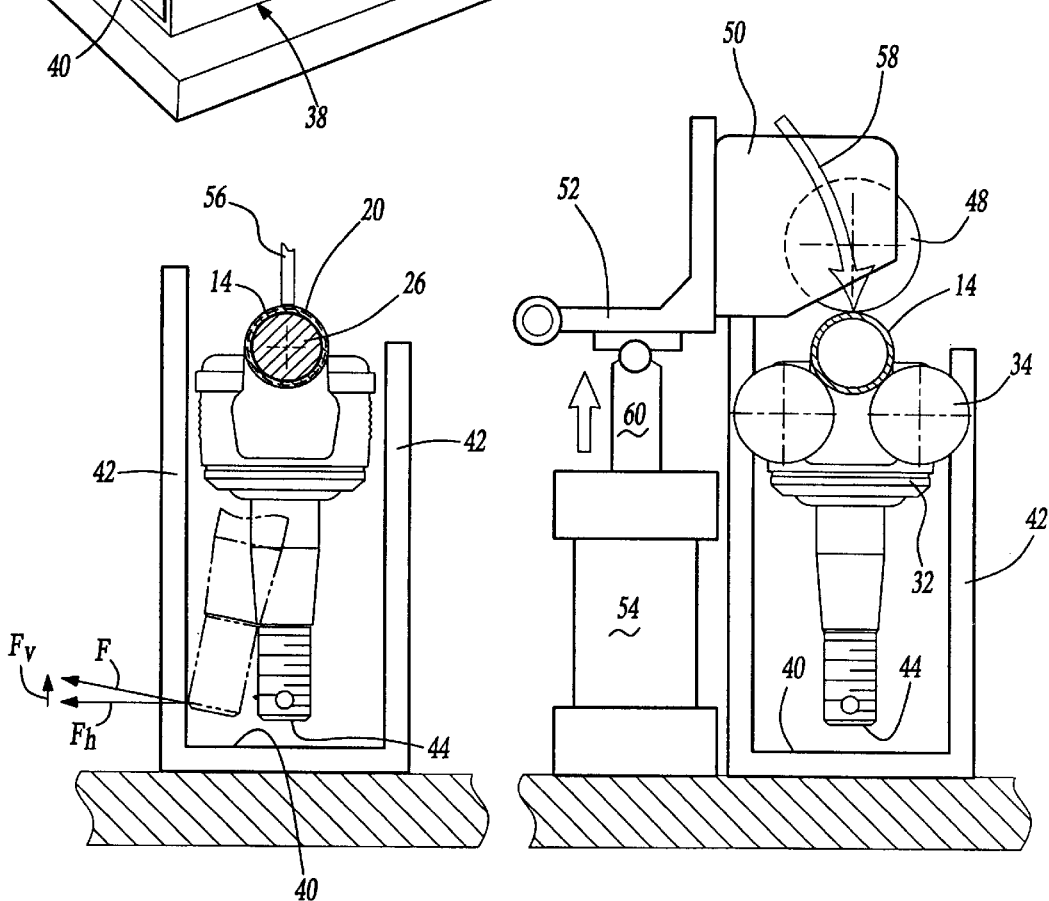
FIG. 2 is a cross-sectional view of the apparatus taken along line 2—2 of FIG. 1.
FIG. 3 is a cross-sectional view of the apparatus taken along line 3—3 of FIG. 1.

In FIGS. 1–3, a tie rod assembly 12 is shown inserted into a tube spinner 10 of the present invention. Tie rod assembly 12 includes a central tube 14 having a left tube end 16 and a right tube end 18. Tube 14 is internally threaded at each end with threads 20 and 22 extending inwardly along a main axis A—A of tube 14. A central portion 24 of tube 14 has no threads. The threads must be of opposite direction. Thus, if threads 20 are left-handed threads, threads 22 are right-handed threads. If threads 20 are left-handed, left end 16 is fitted with a left hand socket 26 while right tube end 18 is fitted with a right hand socket 28. The orientation of threads 20, 22 depends upon the direction of rotation of tube spinner 10, as discussed below. As seen in FIG. 1, sockets 26 and 28 include a ball-joint 30, 32 that is off-set from main longitudinal axis A—A of tube 14. Because sockets 30, 32 are off-set from main axis A—A, a center of gravity of sockets 26, 28 is also offset from main axis A—A, resulting in an out-of-balance condition for assembly 12.

To overcome the out-of-balance condition, tube spinner 10 is used. First, one or more sockets 26, 28 of tie rod assembly 12 are inserted into respective ends 16, 18 of tube 14 before placing the tie rod assembly 12 into tube spinner 10. Preferably, sockets 26, 28 are inserted a like amount and in a same initial orientation. But, it may be desirable to first insert sockets 26, 28 in a different orientation, depending upon the required configuration of the finished tie rod assembly. After inserting sockets 26, 28, assembly 12 is placed on a support structure within tube spinner 10. As shown in FIG. 1, the support structure preferably is composed of a plurality of casters 34 that are positioned to form V-blocks 36 to support tie rod assembly 12. Castors 34 provide a nearly frictionless support structure, allowing tube 14 to rotate along main axis A—A with minimal resistance. Tube spinner 10 further includes a restraining structure positioned longitudinally outward of ends 16, 18 of tube 14. Preferably, identical tracks 38 are positioned longitudinally outward of ends 16, 18 of tube 14 so that when assembly 12 is placed into V-blocks 36, sockets 26, 28 are located within tracks 38, thereby preventing sockets 26, 28 from rotating beyond a pre-determined set point while still permitting longitudinal movement. Of course, any geometry may be used for the support structure, including C-shape, A-shape or any other suitable geometry that prevents sockets 26, 28 from rotating beyond a pre-set amount, but permits longitudinal movement and threading of sockets 26, 28. Orientation of the support structure may be adjusted to achieve the required final configuration of tie rod assembly 12. Preferably, tracks 38 accept an assembly having sockets 26, 28 in the same initial orientation. Moreover, in FIG. 1, should be noted that a transverse portion or floor 40 of the tracks 38 does not come into contact with end 44 of the ball-joints 30, 32. Instead, sockets 26, 28 "float" within tracks 38, while being restrained against rotation beyond a pre-determined set point in either rotational direction by walls 42 that are generally perpendicular to floor 40. In a preferred embodiment, walls 42 are parallel to each other.

After tie rod assembly 12 is placed within V-blocks 36 such that sockets 26, 28 both float within their respective track 38, a rotating device 46 is selectively placed into engagement with the outer circumference of tube 14. Preferably, at least one selectively engageable motor driven friction wheel 48 is placed into engagement with the outer circumference of tube 14. More preferably, two high friction drive wheels 48, equally spaced along the length of tube 14, are used to spin tube 14. Wheels 48 are powered by a gear motor 50, and are driven at a pre-selected speed in a pre-selected rotational direction (clockwise when viewed from left end 16 in FIG. 3). Other rotative mechanisms may replace rotating device 46, including a motor driven chuck or similar device. Moreover, it is possible to combine rotating device 46 with the support structure to achieve a reduced size machine.

As noted above, ends 16, 18 of tube 14 are each tapped with oppositely winding threads. With reference to left end 16 of FIGS. 1 and 2, left-handed threads 20 are tapped in end 16 to allow counter-clockwise threading of socket 26 into tube 14. With reference to right end 18 of tube 14, right-handed threads 22 are tapped to allow clockwise threading of socket 28 into tube 14. When high-friction wheels 48 engage the outer circumference of tube 14, gear motor 50 drives wheels 48, which in turn drive tube 14 to spin along its main longitudinal axis A—A (tube 14 spins counter-clockwise in FIGS. 1 and 3 when viewed from left end 16). Because sockets 26, 28 are prevented from spinning with tube 14 by tracks 38 while still permitting longitudinal movement along main longitudinal axis A—A, both sockets 26, 28 are spun into respective tube ends 16, 18 and onto respective threads 20, 22 an identical amount. In this way, tube 14 is always centered within tie rod assembly 12, while sockets 26, 28 are concentrically located with respect to tube 14. Of course, ball joints 30, 32 are preferably inserted into ends 16, 18 in the same orientation and to the same extent before activating tube spinner 10.

Moreover, because sockets 26, 28 are allowed to selectively float within tracks 38, the socket/tube arrangement on tie rod assembly 12 is self aligning. Sockets 26, 28 are drawn or pulled onto tube 14, rather than being forced on by a possibly mis-aligned outside force. The self aligning feature minimizes binding of the sockets within the threads on the ends of tube 14.

As best seen in FIG. 3 a fixed hinge 52 is attached to gear motor 50 to apply force through friction wheels 48 radially onto the outer circumference of tube 14. Preferably, at least one air or hydraulic arrangement, in the form of a movable piston 60 and fixed cylinder 54, applies selective force to hinge 52, causing gear motor 50 and its attached wheels 48 to engage the outer circumference of tube 14. In particular, piston 60 applies a linear force in the direction of arrow 61 to hinge 52. Linear force 61 causes gear motor 50 to pivot about a fixed point to apply a force in a direction generally opposite to linear force 61, creating a radial clamping force against the outer circumference of tube 14. The radial clamping force, indicated in FIG. 3 by arrow 58, applied by wheels 48 against the outer circumference of tube 14 is controlled by the amount of linear force 61 applied by cylinder 54 to piston 60. The radial clamping force is translated into a rotational torque applied to sockets 30, 32 as tube 14 rotates.

As noted above, sockets 26, 28 are prevented from spinning with tube 14 by tracks 38. As shown in phantom in FIG. 2, rotation of tube 14 causes end 44 of the respective ball joints 30, 32 to contact a wall 42 of a respective track 38, exerting a force thereon. The force exerted by an end 44 is translated to a torque applied to the respectively attached socket as tube 14 spins. Thus, as tube 14 spins, sockets 26, 28 are drawn tighter onto respective ends 16, 18 of tube 14. As the force required to spin tube 14 increases due to resistance at threads 20, 22, the force F exerted by end 44 against wall 42 also increases. As shown in FIG. 2, force F includes a horizontal component $F_H$ and a vertical component $F_v$. When the vertical force component $F_v$ exerted by end 44 against wall 42 exceeds the pre-determined clamping force 58, tube assembly 12 will automatically move laterally out of tube spinner 10. In this way, the amount of torque applied to sockets 26, 28 may be regulated. Therefore, a higher radial clamping force 58 applied against the outer circumference of tube 14 by wheels 48 results in a higher torque level being applied to sockets 26, 28 at ends 16 and 18 of tube 14 while tube 14 is spinning.

By regulating the amount of clamping force applied through wheels 48 to the outer circumference of tube 14, a pre-determined socket torque may be set. It will appreciated that if the torque required to thread a socket 26 or 28 into tube 14 exceeds the pre-determined torque (i.e. $F_v$ exceeds clamping force 58), the clamping force 58 applied by wheels 48 will be overcome and assembly 12 will move laterally out of tube spinner 10 under the influence of $F_v$. (Adjusting the height of wall 42 may also facilitate lateral movement of assembly 12.) Limit switches 56 are placed closely adjacent the outer circumference of tube 14, preferably near ends 16 and 18, to detect any lateral movement of tube 14 due to over torque conditions. Upon the detection of any lateral motion of tube 14, known as "kick-out", limit switches 56 act to stop the machine cycle and interrupt power to friction wheel 46. The "kick-out" feature allows the tube spinner operator to immediately identify and reject assemblies that are in an over torqued condition. Thus, the clamping force of the drive wheels may be regulated to allow for different "kick-out" torque values, and to also allow production of tie rod assemblies 12 with varying torque tolerance values on the same tube spinner.

A new method for tie rod assembly is disclosed. First, sockets 26, 28 are attached to the threaded tube 14 to form assembly 12. Preferably, the sockets 26, 28 are attached to tube 14 a like amount and in the same initial orientation. Second, the assembly 12 is placed the tube in support structure, wherein the sockets 26, 28 are restrained against rotation. A rotative force is applied to the outer circumference of the tube 14 such that as the tube 14 spins, sockets 26, 28 are drawn onto the threaded tube. Tube spinner 10 applies the rotative force until the sockets reach a predetermined torque level, at which point the tube spinner 10 is stopped and assembly 12 is removed from the machine. Additionally, limit switches 56 may also remove the rotative force when the tie rod assembly 12 moves in a lateral direction in response to over-torquing of sockets 26, 28.

Tube spinner 10 of the present invention allows for greater uniformity of tie rod assembly because the amount of torque applied to a socket may be carefully controlled. Additionally, because sockets 26, 28 are spun the same amount their respective ends 16, 18 of tube 14, the tube is always centered in the tie rod assembly. Since sockets 26, 28 are prevented from spinning during assembly while being allowed to float within tracks 38, the sockets are assured to be concentric with respect to tube 14. The self-aligning nature of tube spinner 10 of the present invention also minimizes binding and therefore reduces the number of rejected tie rod assemblies, resulting in greater efficiency and less waste. Tube spinner 10 is also much quieter than impact gun methods of assembling tie rod assemblies, and is faster than methods that assemble each end of a tie rod assembly separately. The "kick-out" feature provided by the limit switches also prevents shipment of excessively tightly threaded sockets to customers by regulating the amount of torque applied to each socket.

Preferred embodiments of the present invention have been disclosed. A person of ordinary skill in the art would realize, however, that certain modifications would come within the teachings of this invention. For example, tracks 38 may be replaced by any appropriate structure or mechanism that permits longitudinal movement of sockets 26, 28 but limits rotational movement. Therefore, the following claims should be studied to determine the true scope and content of the invention.

What is claimed is:

1. An apparatus for assembling tie rods, comprising:

a base a support structure mounted on said base for supporting a tapped tube;

a rotating device mounted on said base adjacent said support structure for rotating said tube within said support structure into threaded engagement with at least two sockets simultaneously;

a restraining structure mounted on said base on opposite sides of said rotating device and said support structure for limiting rotation of sockets; and at least one limit switch operatively associated with said rotating device for contacting an outer circumference of said tube for stopping said rotating device upon detecting lateral movement of said tube.

2. The apparatus of claim 1, wherein said rotating device further comprising a force applying apparatus for selectively exerting a pre-determined clamping force through said rotating device against an outer circumference of said tube.

3. The apparatus of claim 1, wherein said restraining structure limits rotational movement of sockets while simultaneously permitting longitudinal movement thereof.

4. The apparatus of claim 3, further comprising a force applying apparatus for selectively exerting a predetermined clamping force through said rotating device against an outer circumference of said tube.

5. The apparatus of claim 1, wherein said support structure includes a plurality of casters for supporting a tube along a main axis thereof.

6. The apparatus of claimed 5, wherein said restraining structure includes left and right generally U-shaped tracks.

7. The apparatus of claim 6, wherein said rotating device includes at least one selectively engagable motor-driven friction wheel for rotating said tube along said main axis.

8. The apparatus of claim 1, further comprising a hinge attached to said rotating device and a lifting piston attached to said hinge, whereby a force applied by said piston to said hinge is applied to said tube through said rotating device.

9. A method of threadedly attaching at least one socket to a threaded tube to form a tie rod assembly, comprising:

attaching the socket to the threaded tube;

placing the tube in a support structure, wherein said socket is restrained against rotation by a restraining structure; and applying rotative force to the outer circumference of said tube such that said socket is drawn onto the threaded tube;

removing said rotative force when the tube moves in a lateral direction deleted by a limit switch; and removing said rotative force when a predetermined torque level is reached.

* * * * *